(12) United States Patent
Miedziejewski (10) Patent No.: US 10,896,094 B2
(45) Date of Patent: Jan. 19, 2021

(54) AUTOMATED FAILOVER OF DATA TRAFFIC ROUTES FOR NETWORK-BASED APPLICATIONS

(71) Applicant: MASTERCARD INTERNATIONAL INCORPORATED, Purchase, NY (US)

(72) Inventor: Adam Miedziejewski, Dublin (IE)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 190 days.

(21) Appl. No.: 16/043,115

(22) Filed: Jul. 23, 2018

(65) Prior Publication Data

US 2020/0026604 A1   Jan. 23, 2020

(51) Int. Cl.
*G06F 11/00* (2006.01)
*G06F 11/14* (2006.01)

(52) U.S. Cl.
CPC .... *G06F 11/1423* (2013.01); *G06F 2201/805* (2013.01); *G06F 2201/82* (2013.01)

(58) Field of Classification Search
CPC ............. G06F 11/1423; G06F 11/0709; G06F 11/0793; G06F 11/2023; G06F 11/2025; G06F 11/203; G06F 2201/805; G06F 2201/82
See application file for complete search history.

(56) References Cited

U.S. PATENT DOCUMENTS

| | | | |
|---|---|---|---|
| 2006/0031594 A1* | 2/2006 | Kodama | G06F 11/2058 710/5 |
| 2015/0244671 A1* | 8/2015 | Sinn | H04L 61/00 709/245 |
| 2017/0310763 A1* | 10/2017 | Morgan | H04L 67/141 |
| 2018/0095845 A1* | 4/2018 | Sanakkayala | H04L 43/10 |
| 2018/0165170 A1* | 6/2018 | Hegdal | G06F 8/60 |

* cited by examiner

*Primary Examiner* — Joseph D Manoskey (57) ABSTRACT

The disclosure facilitates rerouting data traffic of applications. A failover request is received by a failover application including an application identifier of a main application, the failover application indicating at least one sub-application and a target data source. The failover application selects a configuration data set of the main application based on the application identifier, wherein the selected configuration data set defines an address mask of the target data source associated with the at least one sub-application. The failover application generates failover instructions for activating data traffic routing of the at least one sub-application to the target data source based on the address mask of the target data source. The failover application provides the generated failover instructions to a data traffic manager associated with the main application, whereby data traffic of the at least one sub-application is routed to the target data source by the data traffic manager.

20 Claims, 6 Drawing Sheets

AUTOMATED FAILOVER OF DATA TRAFFIC ROUTES FOR NETWORK-BASED APPLICATIONS

BACKGROUND

With the spread of access to the Internet and other networks, web services have become an important way for users to access and manage data. Systems providing the web services may include multiple servers and/or data sources (e.g., databases, etc.) distributed throughout a network in a variety of physical and/or network locations. Data redundancy techniques may be used across multiple data sources to ensure access to data despite network failures and/or data source downtime. However, in systems that host multiple web service applications across multiple server devices with access to multiple redundant data sources, ensuring data traffic of each application is routed efficiently by rerouting data traffic between redundant data sources as in response to data traffic issues may require specific, complex actions for each application. Such actions (e.g., manually rerouting traffic of each application based on the specific configuration of the application, writing and maintaining specific scripts for rerouting traffic of each application, etc.) may require substantial effort from developers, engineers, or other responsible users. Further, the response to detected data traffic issues may be slowed due to the required effort.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for rerouting data traffic of applications is described. The method comprises receiving, by a failover application, a failover request including an application identifier of a main application, the failover request indicating at least one sub-application of the main application and a target data source. The failover application selects a configuration data set of the main application from a plurality of configuration data sets associated with a plurality of applications based on the application identifier, wherein the selected configuration data set defines address masks associated with the at least one sub-application, the address masks including at least one address mask of the target data source relative to the at least one sub-application. The failover application generates failover instructions for activating data traffic routing of the at least one sub-application to the target data source based on the at least one address mask of the target data source. Then, the failover application provides the generated failover instructions to a data traffic manager associated with the main application, whereby data traffic of the at least one sub-application is routed to the target data source by the data traffic manager.

Many of the attendant features will be more readily appreciated as the same becomes better understood by reference to the following detailed description considered in connection with the accompanying drawings.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 6, the systems are illustrated as schematic drawings. The drawings may not be to scale.

DETAILED DESCRIPTION

The systems and methods described herein are configured for rerouting data traffic of applications to data sources. A failover application receives a failover request indicating a main application, associated sub-applications of the main application, and a target data source for the failover. The failover application identifies configuration data unique to the main application that includes one or more address masks associated with the target data source. The address masks enable routing of data traffic from the main application and associated sub-applications to the target data source. The failover application generates failover instructions for activating data traffic routing of the main application and/or sub-applications to the target data source based on the address mask(s) of the target data source. Then, the failover application provides the generated failover instructions to a data traffic manager associated with the main application, whereby data traffic of the at least one sub-application is routed to the target data source by the data traffic manager. The failover application provides flexible failover functionality that can be applied to any main application and associated sub-applications that include a compatible set of configuration data.

The described disclosure improves the functionality and efficiency of complex computing systems that provide web services and/or other services requiring the routing of data from multiple data sources over a network by offering a quick, thorough tool for rerouting data traffic between data sources for any applications of the system. Further, the described failover application reduces the effort required from developers, engineers and other users who may be responsible for maintaining the performance of a web services system by providing an automated solution for rerouting traffic that responds quickly to detected traffic routing issues and that is highly flexible, providing compatibility with any application that has an associated configuration data set.

Figure 1:
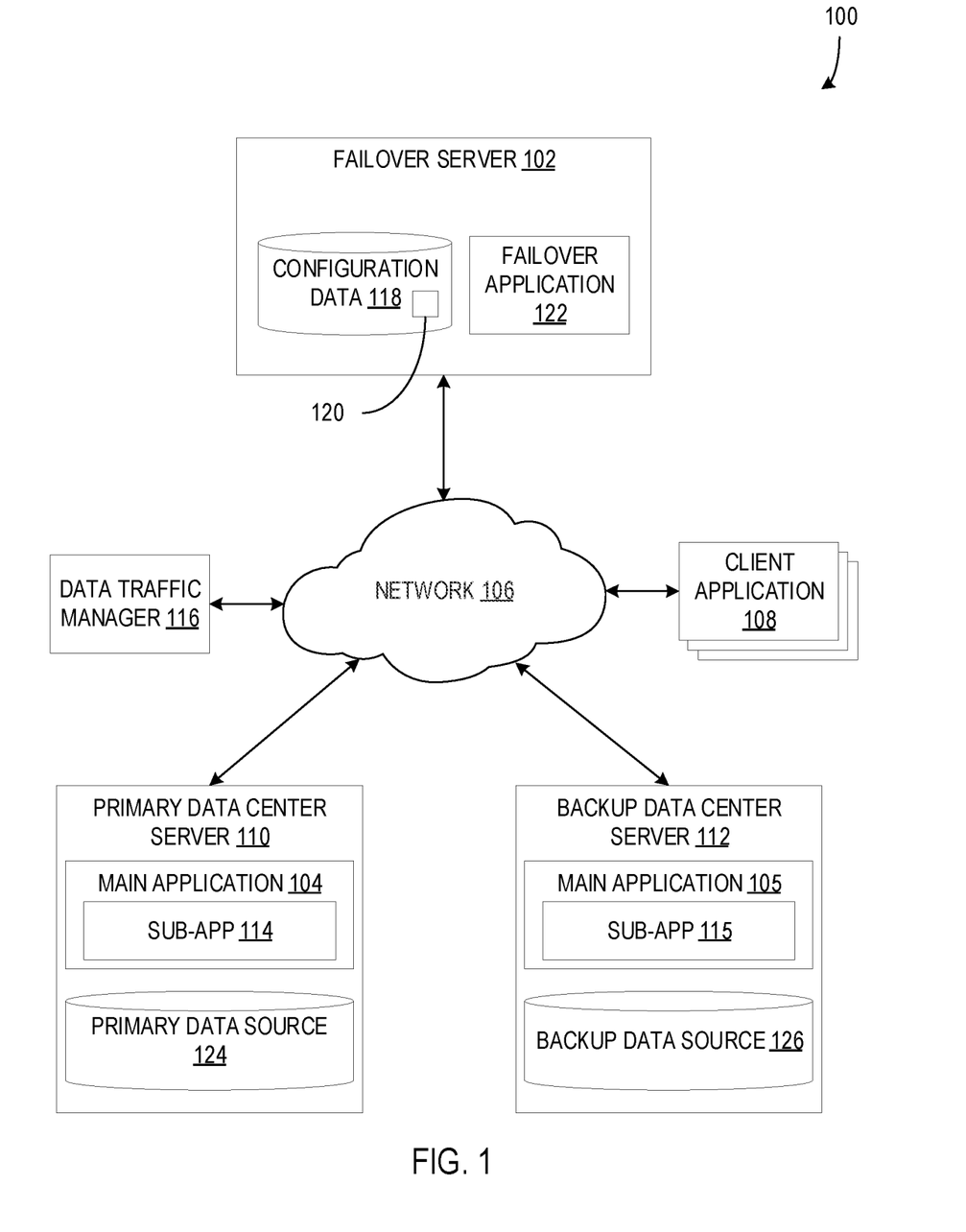
FIG. 1 is an exemplary block diagram illustrating a system configured for failing over application data traffic from a primary data source to a backup data source according to an embodiment.

FIG. 1 is an exemplary block diagram illustrating a system 100 configured for failing over application data traffic from a primary data source 124 to a backup data source 126 according to an embodiment. The system includes at least one failover server 102, which includes configuration data 118 and executes a failover application 122. The failover server 102 connects to a network 106 and client applications 108 communicate over the network 106 with the associated main applications 104 and 105 on the primary data center server 110 and backup data center server 112. Primary data source 124 and backup data source 126 store and provide data to the main applications 104 and 105 respectively, which serve data over the network 106 based on requests or other communications from client applications 108 and/or other applications connection to the network 106.

The failover server 102, primary data center server 110, and backup data center server 112 are computing devices comprising hardware and software as described herein. In some examples, the servers 102, 110, and 112 include processors configured to execute instructions to provide the functionality described herein. The servers 102, 110, and 112 may be connected to the network 106 through one or more interfaces that would be understood by a person of ordinary skill in the art without departing from the description. Further, the main applications 104 and 105 include one or more sub-applications 114 and 115 that provide specific functionality of the main applications 104 and 105 respectively. The one or more sub-applications 114 and 115 may each include or be associated with separate streams of data traffic routed to and/or from the primary data source 124 and/or the backup data source 126. For instance, a first sub-application 114 may route data traffic to and/or from the primary data source 124 while a second sub-application 115 may route data traffic to and/or from the backup data source 126. The main applications 104 and 105 and associated sub-applications 114 and 115 may be configured to provide server-based web services to associated client applications 108, which may be used by users to access, view, and/or change data. In some examples, the main applications 104 and 105 and associated sub-applications 114 and 115 are redundant instances of the same application, such that client applications 108 and other application may interact with either the main application 104 on the primary data center server 110 or the main application 105 on the backup data center server 112, depending on how the associated data traffic is routed by the data traffic manager 116. The services provided by the main applications 104 and 105 may include providing access to an electronic wallet (e-wallet), providing management services of a user account associated with a user's bank account, etc. Sub-applications 114 and 115 may include applications for handling specific types of data and/or transactions within main applications 104 and 105, such as a sub-application for handling data traffic associated with requests from client applications 108, a sub-application for handling data traffic associated with back-end or server-based requests, a sub-application associated with security-based (e.g. user authentication, etc.) data traffic, etc. Alternatively, or additionally, the main applications 104 and 105, in conjunction with sub-applications 114 and 115, may provide any web services or associated functionality as would be understood by a person of ordinary skill in the art without departing from the description herein.

The system 100 further includes a data traffic manager 116. The data traffic manager 116 is a software component that may be included in one or more of the servers 102, 110, or 112 or, alternatively, in a separate server, as illustrated in system 100. The data traffic manager 116 is configured to manage data traffic routing of the main applications 104 and 105 and/or each of the one or more sub-applications 114 and 115. In some examples, the data traffic manager 116 further includes a processor configured to execute instructions to provide the data traffic management functionality described herein. The data traffic manager 116 may include application program interfaces (APIs) that enable other applications and/or software to interact with the data traffic manager 116 (e.g., sending instructions to the data traffic manager 116, receiving output from the data traffic manager 116, etc.). Instructions received by the data traffic manager 116 may cause the data traffic manager 116 to provide status information associated with the current data traffic routing of associated applications (e.g., main application 104, sub-applications 114, etc.) and change data traffic routing of the associated applications to and/or from data sources (e.g., primary data source 124 and/or backup data source 126, etc.). In an example, the data traffic manager 116 is configured for interaction via representational state transfer (REST) APIs with other applications, scripts, or software. Further, the data traffic manager 116 may be configured as a web service that can receive instructions from other software in JavaScript Object Notation (JSON).

Configuration data 118 stored on the failover server 102 includes configuration data associated with the main applications 104 and 105 and the sub-applications 114 and 115. In some examples, the configuration data 118 includes configuration data associated with a plurality of main applications (e.g., main application 104, etc.) and the sub-applications associated with the plurality of main applications. Specifically, the configuration data 118 includes address masks 120 of data sources (e.g., primary data source 124, backup data source 126, etc.) associated with applications (e.g., applications 104 and 105, sub-applications 114 and 115, etc.) in relation to the network locations of the client applications 108 and other servers of system 100. In an example, an address mask of a data source relative to a sub-application includes a subnet address mask of the IP address of the data source that can be applied to data traffic of the sub-application to direct that data traffic to the data source. The configuration data 118 may be stored in a data structure arranged to represent a structure of the failover server 102, the main applications 104 and 105, sub-applications 114 and 115, primary data source 124, and backup data source 126 based on relative network locations in network 106. In some examples, the configuration data 118 includes extensible markup language (XML) files for each main application (e.g., main application 104, 105, etc.) that include nested XML code defining the address masks 120 for relationships between sub-applications 114 and 115, pools or groups of applications or subnetworks, and data sources (e.g., primary data source 124, backup data source 126, etc.) based on server devices (e.g., failover server 102, etc.) upon which the sub-applications 114 are executed. The defined address masks 120 may be used to reroute data traffic for the main applications 104 and 105 and associated sub-applications 114 and 115 using the data traffic manager 116. An address mask 120 may include a portion of an internet protocol (IP) address of an associated server (e.g., primary data center server 110, etc.) and/or data source associated with the server (e.g., primary data source 124, etc.) within the network 106. In some examples, an address mask 120 may also include a specific network port to which data traffic should be routed for the associated data source. An example of configuration data 118 is shown below.

```
<MainAppIdentifier>
    <application name="SubApp1">
        <device name="Server1">
            <pool name="Pool1">
                <site name="primary" mask="XX.XXX"/>
                <site name="backup" mask="YY.YYY"/>
            </pool>
        </device>
    </application>
    <application name="SubApp2">
        <device name="Server1">
            <pool name="Pool1">
                <site name="primary" mask="XX.XXX"/>
                <site name="backup" mask="YY.YYY"/>
            </pool>
        </device>
        <device name="Server2">
            <pool name="Pool2">
                <site name="primary" mask="XX.XXX.XXX"/>
                <site name="backup" mask="YY.YYY.YYY"/>
            </pool>
        </device>
    </application>
</MainAppIdentifier>
```

In the above configuration data 118 example, a main application identified by "MainAppIdentifier" includes two sub-applications, "SubApp1" and "SubApp2". Each sub-application includes configuration data for an application server device "Server1" and a pool "Pool1", and SubApp2 additionally includes configuration data for a second application server device "Server2" and pool "Pool2". For each combination of sub-application and server device, an address mask is provided for a primary data source site and a backup data source site. While SubApp1 and SubApp2 on Server1 share the same address masks for the primary and backup data source sites, SubApp2 on Server2 includes longer address masks for the primary and backup data source sites. The difference in address masks may be due to differing network locations between the Server1 and Server2 application server devices. In an example, SubApp1 may be responsible for handling data traffic associated with user authentication and other security-based processes, while SubApp2 may handle data traffic associated with user data requests, etc.

In other examples, address masks 120 of configuration data 118 may differ for different sub-applications on the same server application device, the same sub-application on different server application devices, different sub-applications on different server application devices, etc. In further examples, the configuration data 118 also includes other network structure elements such as pools, which are used to group different network elements of sub-application (e.g. pools are often used to group Java Virtual Machine (JVM) servers or TIVOLI ACCESS MANAGER (TAM)/Lightweight Directory Access Protocol (LDAP) authentication servers, etc.). Pools enable traffic associated with each part of a network infrastructure to be routed independently. Configuration data 118 and associated address masks 120 may include and/or depend on network arrangements and/or network structural elements as would be understood by a person of ordinary skill in the art without departing from the description herein.

The failover server 102 further includes a failover application 122 that makes use of configuration data 118 and the data traffic manager 116 to fail over data traffic routing of the main applications 104 and 105 and/or sub-applications 114 and 115 between data sources 124 and 126 based on received failover requests. In some examples, the failover application 122 includes a processor configured to execute instructions to provide the failover functionality described herein. Alternatively, or additionally, the failover application 122 may be configured as a web application or script that is accessible by one or more computing devices in the system 100.

The failover application 122 may receive failover requests from other software, such as a monitor application that monitors the status data traffic in the network 106, or from commands sent from users via a command line or other interface (e.g., a call to a failover application script, etc.). A failover request may include an application identifier of the main application 104 or 105, some indicator that indicates the sub-applications 114 or 115 that are to be affected by the failover process, and a site name or other identifier of the data source to which the failover application 122 is instructed to reroute data traffic. Additionally, a failover request may include an indicator of the type of action to be taken by the failover application 122 (e.g., failover to a particular data source, bring a particular data source down such that all data traffic is rerouted, bring a particular data source up such that data traffic may be rerouted to the data source, failover "hard" to a particular data source to delete persistence connections after traffic routing). The "hard" option provides an additional measure of security when used to route traffic for parts of the infrastructure that transmit very sensitive data (credit card details, passwords etc.). Further, the failover application 122 may be configured to receive failover requests for checking a status of data traffic associated with applications and/or sub-applications to data sources and/or to specific IP addresses.

Upon receiving a failover request, the failover application 122 is configured to access the configuration data 118 to select the configuration data 118 of the main application 104 or 105 based on the application identifier provided in the failover request. The failover application 122 is further configured to use the selected configuration data 118 to generate failover instructions for rerouting data traffic of the main application 104 or 105, including the data traffic of indicated sub-applications 114 or 115 from the failover request, to the data source indicated in the failover request (e.g., rerouting data traffic from the primary data center server 110 and primary data source 124 to the backup data center server 112 and backup data source 126, etc.). The generated failover instructions may be provided to the data traffic manager 116, whereby the data traffic is rerouted accordingly. This process is described in greater detail below.

The system 100 further includes client applications 108, as mentioned above. The client applications 108 may be configured to provide a user interface to users and to interact with the main applications 104 and 105 based on input provided by the users of the client applications 108. The interactions between the client applications 108 and main applications 104 and 105 may be configured as a web service of the main applications 104 and 105 being provided to a web browser or similar application of the client applications 108. Data that may be necessary for the functionality provided by the main applications 104 and 105 and/or the client applications 108 may be obtained from the primary data source 124 and/or the backup data source 126 by the main applications 104 and/or 105 respectively as described herein.

The primary data source 124 and the backup data source 126 include data structures for storing data associated with the main applications 104 and 105 and other applications of the system 100. The data structures may be in the form of databases or the like. The primary data source 124 and backup data source 126 may provide redundant data storage, such that when a change is made the data stored on one data source, the change is also made on the other data source. The primary and backup data sources 124 and 126 may be configured according to any redundant storage technique as would be understood by a person of ordinary skill in the art without departing from the description herein.

It should be understood that network 106 may include one or more integrated or otherwise connected networks. The network 106 may include public and/or private networks, large-scale networks, such as the Internet, and/or relatively smaller intranets. The network 106 may be accessed via wired and/or wireless connections, using any and all network protocols as understood by a person of ordinary skill in the art.

In some examples, the system 100 includes a plurality of servers like the failover server 102, the primary data center server 110 and/or the backup data center server 112. The servers may include a plurality of applications like main applications 104 and 105, and each server may include more, fewer, or different applications from any other application server in the system 100. Each server may have a different network location with respect to network 106.

A data traffic manager 116 may be stored and/or executed on one or more of the plurality of servers in the system 100. Alternatively, the data traffic manager 116 may be stored and/or executed on a computer device separate from the servers, such as a computer device hosting one or more of the client applications 108, the primary data center server 110, or the backup data center server 112 or a computer device independent from the other components of the system 100. Similarly, the failover application 122 may be stored, installed, and/or executed on one or more of the plurality of servers and/or on a computer device independent from the other components of the system 100.

In some examples, the configuration data 118 of main applications 104 and 105 may be stored with the main application on the primary data center server 110 or backup data center server 112 respectively. However, in alternative examples, the configuration data 118 may be stored elsewhere in the system 100 where it may be accessible over the network 106.

Figure 2:
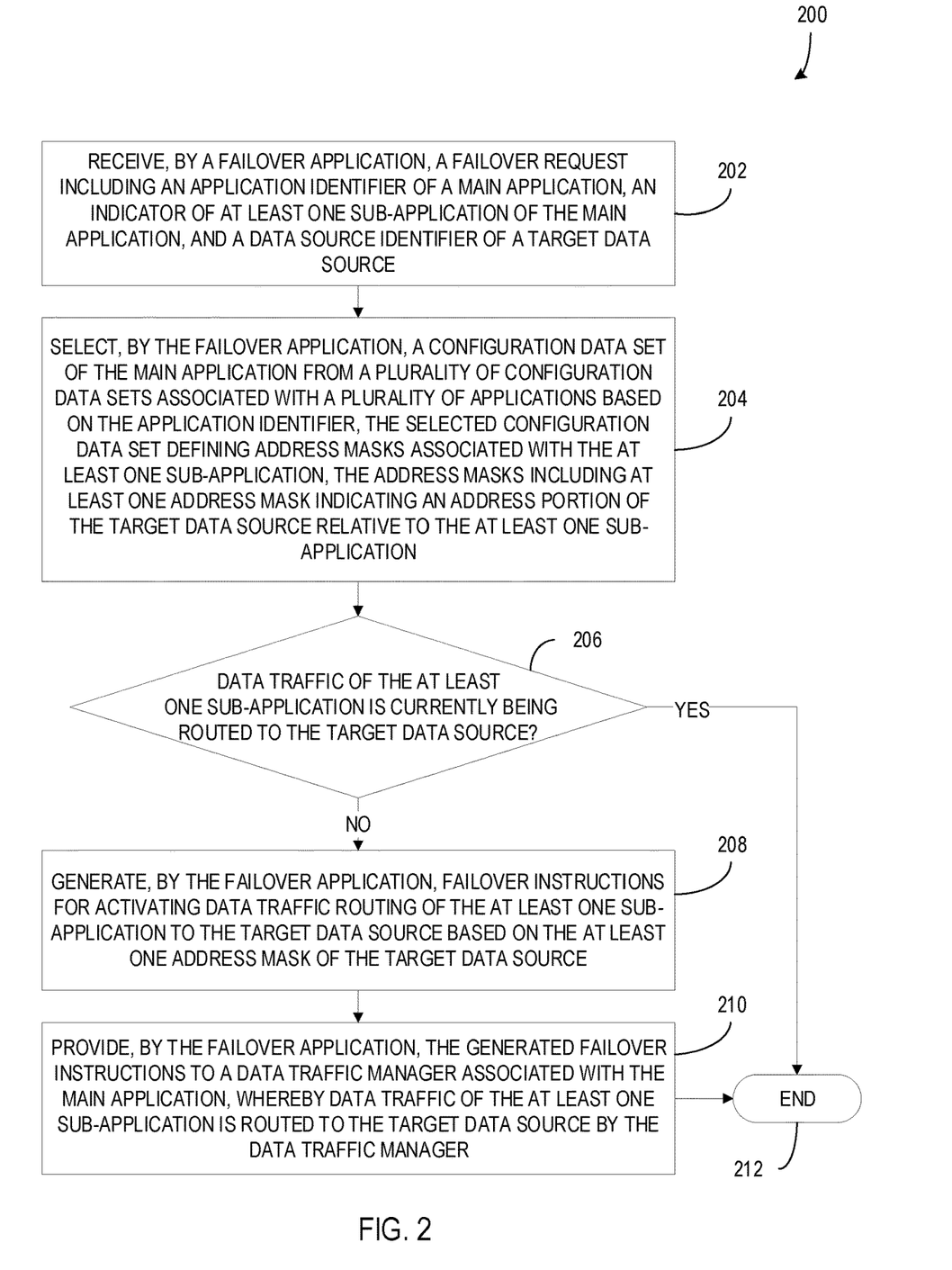
FIG. 2 is an exemplary flow chart illustrating a process of failing over application data traffic of a main application and at least one associated sub-application to a target data source according to an embodiment.

FIG. 2 is an exemplary flow chart 200 illustrating a process of failing over application data traffic of a main application and at least one associated sub-application to a target data source according to an embodiment. At 202, a failover application receives a failover request including an application identifier of a main application (e.g., an identifier of redundant main applications 104 and 105, etc.), an indicator of at least one sub-application of the main application (e.g., an indicator of redundant sub-applications 114 and 115, etc.), and a data source identifier of a target data source (e.g., an identifier of one of the primary data center server 110 and primary data source 124 or the backup data center server 112 and backup data source 126, etc.). The data source identifier indicates that the target data source is the data source to which data traffic is to be rerouted.

At 204, the failover application selects a configuration data set of the main application from a plurality of configuration data sets associated with a plurality of applications based on the application identifier. The selected configuration data set defines address masks associated with the at least one sub-application, such that the address masks include at least one address mask indicating an address portion of the target data source relative to the at least one sub-application. In an example, an address mask of a data source relative to a sub-application includes a subnet address mask (e.g., the address portion) of the IP address of the data source that can be applied to data traffic of the sub-application to direct that data traffic to the data source. It should be understood that the failover application is configured such that it may be used to reroute data traffic of any application of the plurality of applications as long as the application has an associated configuration data set that is compatible with the failover application. Applications with more, fewer, or different sets of sub-applications, applications hosted on different devices and/or in different network locations, etc. may have data traffic rerouted by the failover application based on an associated configuration data set.

In some examples, the failover application may include a function for iterating through the configuration data set to identify the at least one sub-application as indicated by the indicator included in the failover request. The at least one sub-application may include a plurality of sub-applications associated with the main application. The plurality of sub-applications may include all the sub-applications of the main application or a custom subset of sub-applications that may be defined in the configuration data set of the main application. Alternatively, indicator of the failover request may include an identifier of a single sub-application, such that the at least one sub-application includes only the identified single sub-application.

If, at 206, data traffic of the at least one sub-application is being routed to a current data source different from the target data source, the failover application generates, at 208, failover instructions for activating data traffic routing of the at least one sub-application to the target data source based on the at least one address mask of the target data source. To test the current data traffic routing, the failover application may run a status function that checks the current data routing status of each of the at least one sub-application. Failover instructions may be generated only for the sub-application that are currently routing data traffic to data sources other than the target data source.

The failover instructions may be generated by iterating through the indicated at least one sub-application and generating a specific instruction for each iterated sub-application. In some examples, the failover instructions are generated in the form of JSON code. For example, a JSON instruction may include a string of index-value pairs as shown below.

{"name":"pool1","members":[{"name":"YY.YYY.YYY.YYY:ZZZ",
"priorityGroup":"100","state":"user-
up","session":"user-enabled"}]}

This JSON instruction indicates that traffic of a sub-application should be routed using the addresses included across specified pools. The priorityGroup may indicate a priority level of the data traffic routing as described herein. The state and session are other settings that may be changed by the data traffic manager (e.g., the state or session of the routing may be overridden to be "down" by a user, etc.).

In alternative examples, the failover instructions may be generated in any other form that may be compatible with a data traffic manager and any associated APIs as understood by a person of ordinary skill in the art. Each generated instruction may include an address mask associated with the specific sub-application and the target data source from the selected configuration data set (e.g., the address mask that includes an address portion of the network location of the target data source relative to the specific sub-application, etc.).

In some examples, the generated failover instructions may further include instructions for deactivating data traffic routing of the at least one sub application to the current data source. The failover instructions for deactivating data traffic routing to the current data source may include an IP address associated with the specific sub-application and the target data source from the selected configuration data set, as described above with respect to the failover instruction for activating data traffic routing of the target data source. In this case, the target data source may indicate the data source to which all data traffic should be rerouted or the target data source may indicate the data source that is being deactivated with respect to data traffic of the indicated sub-application.

At 210, the failover application provides the generated failover instructions to a data traffic manager associated with the main application, whereby data traffic of the at least one sub-application is routed to the target data source by the data traffic manager. A data traffic manager may be associated with the main application when the data traffic manager is configured to manage and/or route data traffic for the main application, including any sub-applications of the main application. The failover instructions may be provided to the data traffic manager through exposed APIs of the data traffic manager (e.g., REST APIs, etc.).

In some examples, the data traffic manager may be configured to route traffic to data sources based on priority values of the data sources in relation to the main application and/or sub-applications. For instance, the data traffic manager 116 of FIG. 1 may maintain priority values for each of the primary data source 124 and the backup data source 126 with respect to the main application 104 and/or the sub-applications 114. The default priority value of the primary data source 124 may be 60 (on a scale of 0 to 100) and the default priority value of the backup data source 126 may be 40. Failover over instructions that cause the data traffic manager to reroute traffic of all the sub-applications 114 of the main application 104 from the primary data source 124 to the redundant main application 105 and sub-applications 115 using the backup data source 126 may cause the data traffic manager to change the priority value of the primary data source 124 to 0 and the priority value of the backup data source 126 to 100. Alternatively, or additionally, some generated failover commands may set priority values of the data sources to other values and/or they may revert priority values of the data sources to default values.

At 212, if no data traffic is being routed to a data source different from the target data source, or after the generated failover instructions have been provided to the data traffic manager, the process ends.

Figure 3:
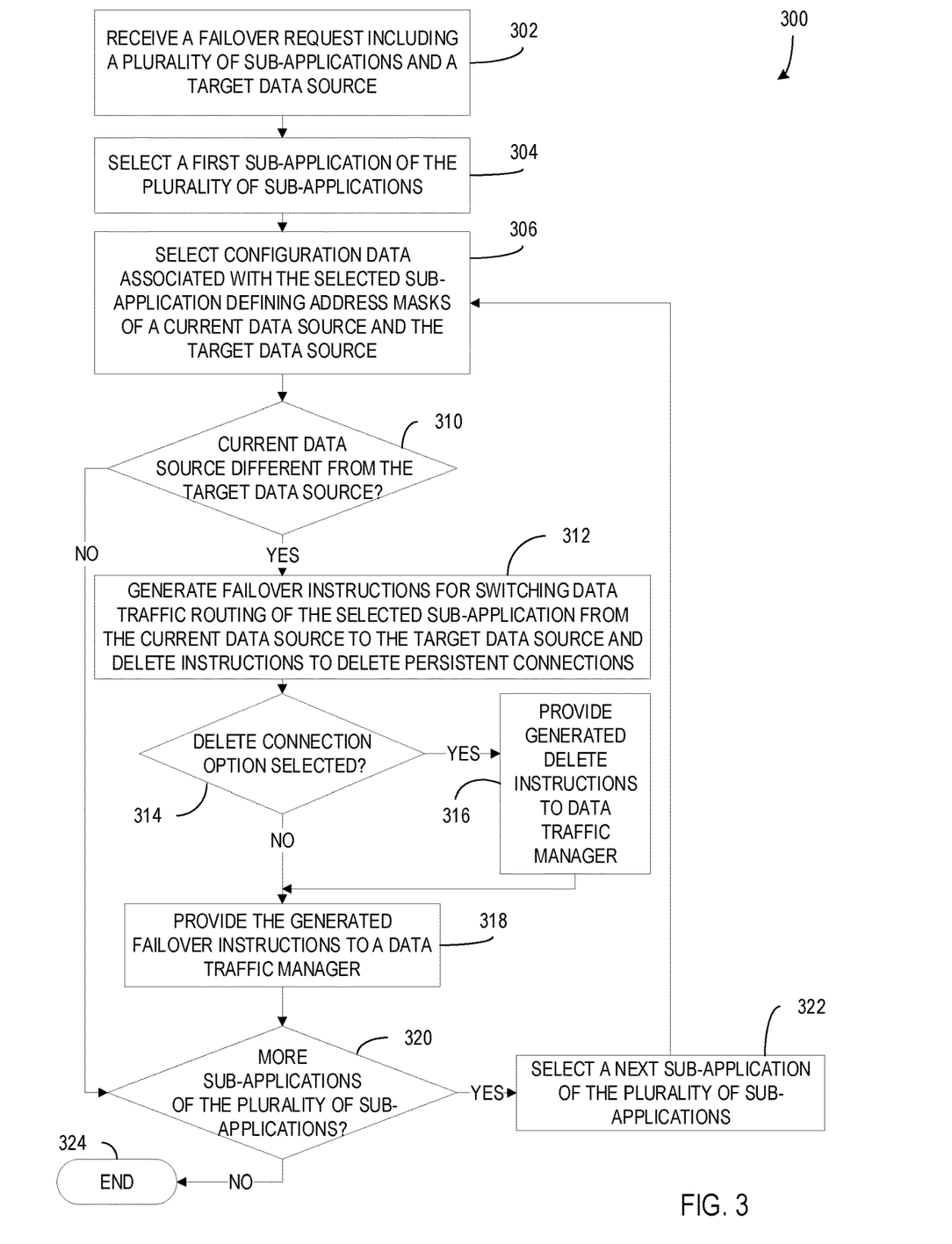
FIG. 3 is an exemplary flow chart illustrating a process of failing over application data traffic and deleting persistent connections of a plurality of sub-applications according to an embodiment.

FIG. 3 is an exemplary flow chart 300 illustrating a process of failing over application data traffic and deleting persistent connections of a plurality of sub-applications according to an embodiment. The process of flow chart 300 may be executed by a failover application as described herein. At 302, a failover request including a plurality of sub-applications and a target data source are received as described above with respect to FIG. 2. The failover application selects a first sub-application of the plurality of sub-applications at 304 and selects configuration data associated with the selected sub-application at 306. The selected configuration data defines address masks of a current data source and the target data source with respect to the selected sub-application. The configuration data may be obtained from a plurality of configuration data sets associated with a plurality of main applications, as described above.

If, at 310, the current data source to which the selected sub-application is routing data traffic is different from the target data source, the failover application generates failover instructions, at 312, for switching data traffic routing of the selected sub-application from the current data source to the target data source based on the address masks. Further, at 312, delete instructions are generated to delete persistent connections to the current data source. The current data source to which the data traffic of the selected sub-application is routed may be obtained by a status retrieval function of the failover application. The generated failover instructions may include a failover instruction for activating the data traffic routing to the target data source and/or a failover instruction for deactivating the data traffic routing to the current data source as described above. The delete instructions may be configured to cause any remaining connection software objects or the like to be deleted, disabled, or otherwise removed, ensuring that the data traffic is completely rerouted and that no artifacts of disabled connections remain. Rerouting data traffic alone may leave behind connection software objects or structures within the network architecture of the associated applications. In some cases, such left-over structures may occupy valuable memory and/or present security concerns. The failover application identifies the sub-applications that are being rerouted and generates instructions to cause the data traffic manager and/or other associated network software to remove persistent connections that are no longer being used after the data traffic is rerouted.

If, at 314, the delete connection option is selected in the failover request for the selected sub-application, the generated delete instructions are provided to a data traffic manager at 316, whereby the connections associated with data traffic routed to the current data source are deleted as described herein. Alternatively, if the delete connection option is not selected at 314, the process proceeds to 318.

At 318, the generated failover instructions are provided to the data traffic manager as described above with respect to 210 of FIG. 2.

In some alternative examples, failover instructions and/or delete instructions are generated at 312, but the instructions are not provided to the data traffic manager and/or executed until after the process of flow chart 300 is completed, or at approximately the same time as 324 below.

If, at 320, there are more sub-applications of the plurality of sub-applications that have not been rerouted yet, the failover application selects a next sub-application of the plurality of sub applications at 322. Steps 306-318 are applied to each sub-application of the plurality of sub-applications as they are selected. If, at 320, no sub-applications remain, the process ends at 324.

Figure 4:
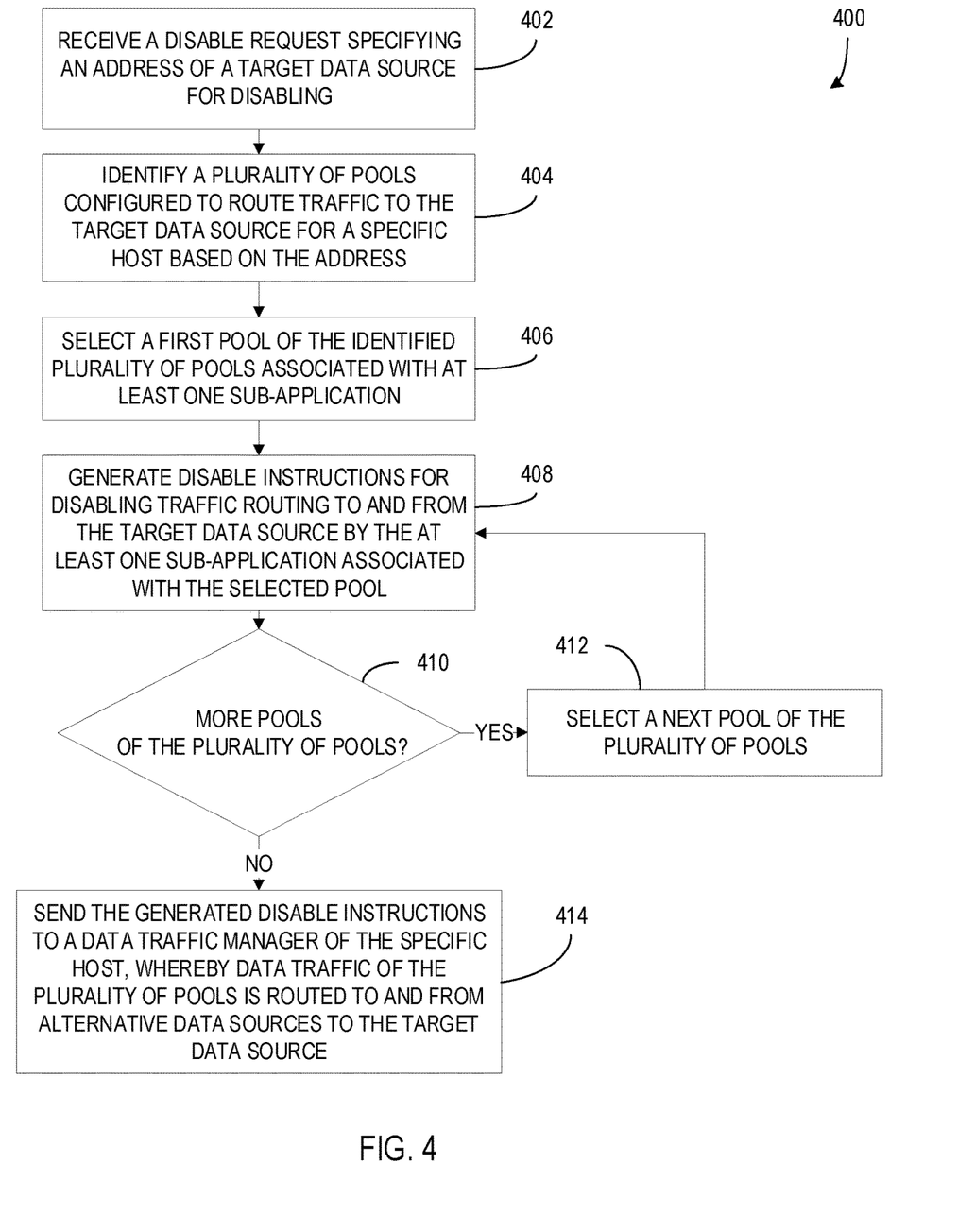
FIG. 4 is an exemplary flow chart illustrating a process of disabling application data traffic of a plurality of applications to and from a data source and rerouting the application data traffic to and from alternative data sources according to an embodiment.

FIG. 4 is an exemplary flow chart 400 illustrating a process of disabling application data traffic of a plurality of applications to and from a data source and rerouting the application data traffic to and from alternative data sources according to an embodiment. A failover application (e.g., failover application 122, etc.) as described herein may be configured to execute the process described in FIG. 4. In some examples, the process of FIG. 4 may occur as a sub-process of the process in FIG. 3 at 312-318. At 402, the failover application may receive a disable request specifying an address of a target data source for disabling. The disable request may be received in the same ways as failover requests described above. The disable request may further include an application identifier of a main application, which is used by the failover application to identify configuration data for use in the process. The address of the disable request may be an IP address or other address for identifying a network location of the target data source.

At 404, the failover application identifies a plurality of pools or groups of applications configured to route traffic to the target data source of a specific host based on the address provided in the disable request. The plurality of pools may include a plurality of sub-applications of a main application based on an application identifier provided in the disable request. Alternatively, the plurality of pools may include multiple main applications and/or associated sub-applications that may have data traffic routed to the target data source based on configuration data (e.g., configuration data 118, etc.) of the applications.

At 406, a first pool of applications of the identified plurality of pools of applications is selected. At 408, the failover application generates disable instructions for disabling traffic routing to and from the target data source by the selected pool of applications. The failover instruction may include instructions to change a priority value of the target data source as described above, instructions to mark the target data source as disabled such that no data traffic is routed to the target data source, or the like.

If, at 410, more pools of the plurality of pools of applications have not been selected, a next pool of the plurality of pools is selected at 412. The step 408 is applied to each pool of the plurality of pools as they are selected.

At 414, the failover application sends the generated disable instructions to a data traffic manager of the specific host, whereby data traffic of the plurality of pools of applications is routed to and from alternative data sources to the target data source.

In some examples, the failover application may receive an enable request similar to the disable request described above. The enable request may result in the failover application generating enable instructions for enabling a target data source based on a provided address. Enabling a target data source may include marking it as enabled such that data traffic may be routed to the target data source and/or setting a priority value of the target data source to a default value with respect to pools of applications and/or sub-applications associated with the target data source.

Figure 5:
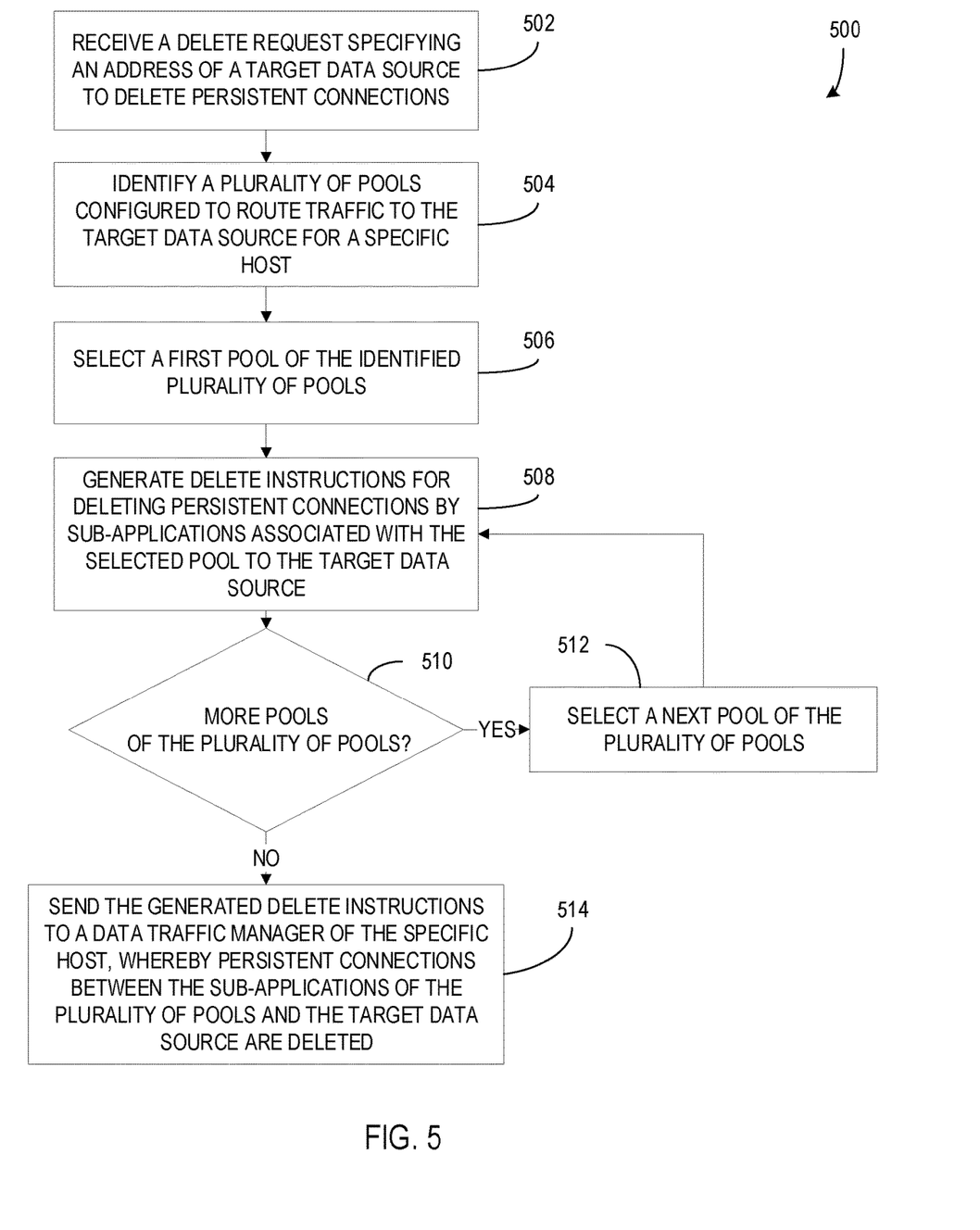
FIG. 5 is an exemplary flow chart illustrating a process of deleting persistent connections for application data traffic of a plurality of applications according to an embodiment.

FIG. 5 is an exemplary flow chart 500 illustrating a process of deleting persistent connections for application data traffic of a plurality of applications according to an embodiment. A failover application (e.g., failover application 122, etc.) as described herein may be configured to execute the process described in FIG. 5. In some examples, the process of FIG. 5 may occur as a sub-process of the process in FIG. 3 at 312-316. At 502, 504, and 506, the process of FIG. 5 is performed in a substantially similar way to the process of FIG. 4, except that the request received is a delete request rather than a disable request.

At 508, the failover application generates delete instructions for deleting persistent connections by sub-applications associated with the selected pool to the target data source. In some examples, the generated delete instructions include instructions that make use of software tools and/or utilities that are present at the data traffic manager. For instance, and exemplary delete instruction is provided below.

run –c 'tmsh delete /sys connection ss-server-addr $ip ss-server-port $port'

In the above example, a Traffic Management Shell tool (tmsh) is used to delete the connections associated with the server address represented by the '$ip' variable and the network port represented by the '$port' variable. It should be understood that the use of the tmsh tool is exemplary and that the delete instructions may include any instructions configured for deleting connections as would be understood by a person of ordinary skill in the art.

If, at 510, more pools of the plurality of pools of applications have not been selected, a next pool of the plurality of pools is selected at 512. The step 508 is applied to each pool of the plurality of pools as they are selected.

At 514, the failover application sends the generated delete instructions to a data traffic manager, whereby any remaining connections associated with the target data source and the plurality of pools of applications are deleted.

Additional Example Scenarios

Aspects of the disclosure enable various additional scenarios, such as next described.

In an example, an application that provides web services for users to access e-wallets is hosted by a system including multiple server devices and multiple redundant data sources distributed throughout a network. A monitor application monitors the data traffic routing of the application to detect performance issues, network failures, or the like between the multiple servers and the multiple data sources. The monitor application detects a network failure in the data traffic routing of the e-wallet application to a primary data source of the multiple data sources. In response, the monitor application generates a failover request including an identifier of the e-wallet application, an indicator indicating all sub-applications of the e-wallet application, and an identifier of a backup data source. The failover request is provided to a failover application.

The failover application accesses and selects a configuration data set associated with the e-wallet application from a plurality of configuration data sets. The plurality of configuration data sets is associated with all main applications that are hosted in the system. The e-wallet application configuration data set includes network structure data reflecting the structure of the e-wallet application and associated sub-applications with respect to the multiple redundant data sources, including address masks indicating network address portions of the multiple data sources relative to the sub-applications and/or server devices upon which the sub-applications are hosted.

The failover application iterates through the sub-applications of the e-wallet application, determining that a first and second sub-applications of three total sub-applications are currently routing data traffic to the primary data source, while the third sub-application is routing data traffic data to the backup data source. The failover application generates failover instructions for each of the first and second sub-applications. The failover instructions include instructions for rerouting data traffic of the sub-applications from the primary data source to the backup data source. In this case, the instructions cause a priority value of the primary data source to be set to zero and a priority value of the backup data source to be set to 100 on a scale of zero to 100 with respect to both the first and second sub-applications. The failover instructions generated in the form of JSON instructions.

After the failover instructions have been generated, the failover instructions are provided to a data traffic manager application using a REST API exposed by the data traffic manager application. The data traffic manager application changes the priority values of the data sources as directed by the failover instructions, such that data traffic of the first and second sub-applications is rerouted to the backup data source.

In a further example, a web developer responsible for the e-wallet application takes steps to address the network failure associated with the primary data source. After fixing the issue, the web developer creates a failover request indicating that the primary data source should be brought up for use again. The failover request is in the form of a script call to a failover script. The web developer calls the failover script, and the failover script generates failover instructions in response. The failover instructions include instructions for resetting the priority values associated with the primary data source and the sub-applications of the e-wallet application to default values. The failover script provides the failover instructions to the data traffic manager, which resets the priority values of the primary data source to default values as directed. Data traffic of the e-wallet application and associated sub-applications may then be rerouted to the primary data source.

Exemplary Operating Environment

Figure 6:
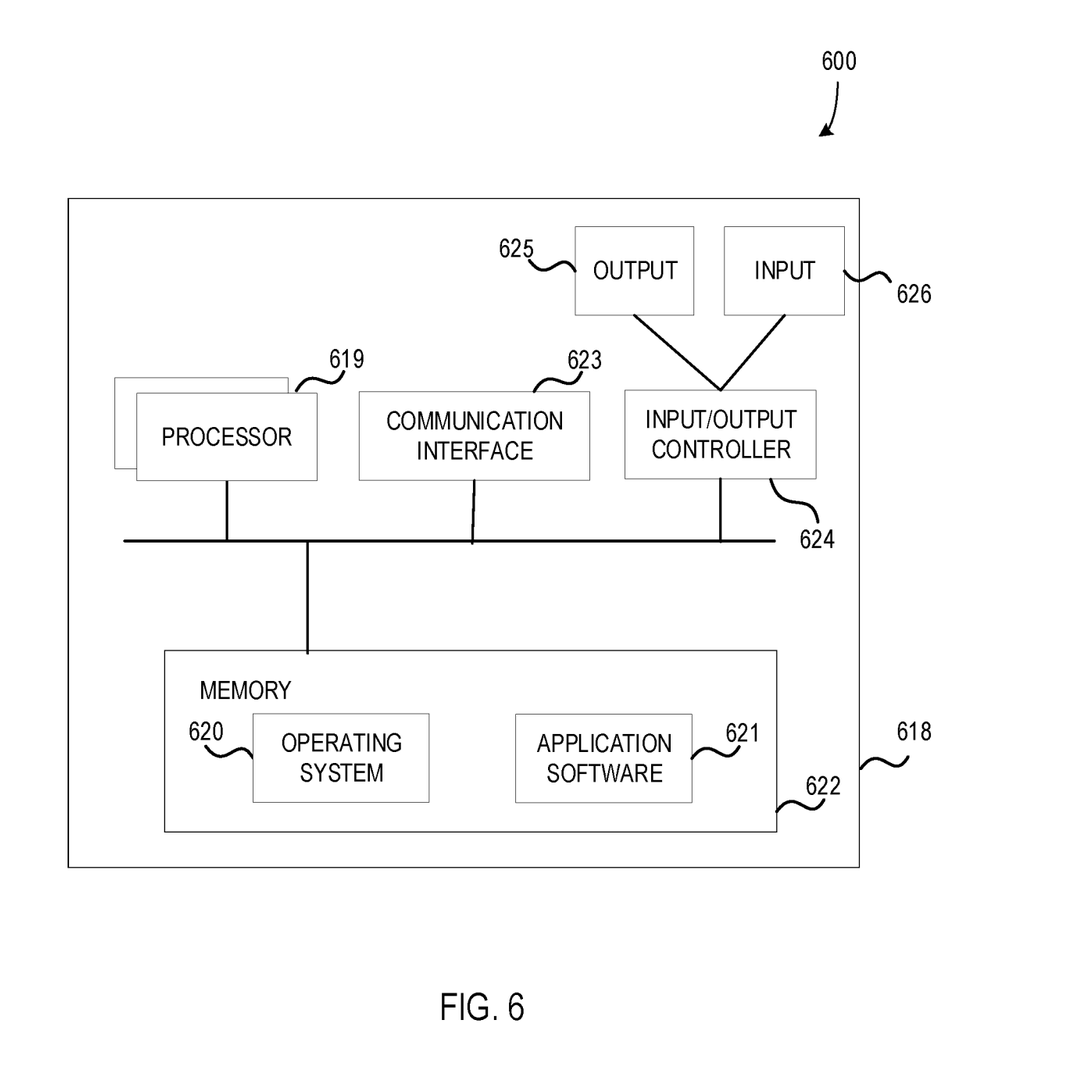
FIG. 6 illustrates a computing apparatus according to an embodiment as a functional block diagram.

The present disclosure is operable with a computing apparatus according to an embodiment as a functional block diagram 600 in FIG. 6. In an embodiment, components of a computing apparatus 618 may be implemented as a part of an electronic device according to one or more embodiments described in this specification. The computing apparatus 618 comprises one or more processors 619 which may be microprocessors, controllers or any other suitable type of processors for processing computer executable instructions to control the operation of the electronic device. Platform software comprising an operating system 620 or any other suitable platform software may be provided on the apparatus 618 to enable application software 621 to be executed on the device. According to an embodiment, receiving failover requests, selecting configuration data sets of applications, generating failover instructions, and providing generated failover instructions as described herein may be accomplished by software.

Computer executable instructions may be provided using any computer-readable media that are accessible by the computing apparatus 618. Computer-readable media may include, for example, computer storage media such as a memory 622 and communications media. Computer storage media, such as a memory 622, include volatile and non-volatile, removable and non-removable media implemented in any method or technology for storage of information such as computer readable instructions, data structures, program modules or the like. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 622) is shown within the computing apparatus 618, it will be appreciated by a person skilled in the art, that the storage may be distributed or located remotely and accessed via a network or other communication link (e.g. using a communication interface 623).

The computing apparatus 618 may comprise an input/output controller 624 configured to output information to one or more output devices 625, for example a display or a speaker, which may be separate from or integral to the electronic device. The input/output controller 624 may also be configured to receive and process an input from one or more input devices 626, for example, a keyboard, a microphone or a touchpad. In one embodiment, the output device 625 may also act as the input device. An example of such a device may be a touch sensitive display. The input/output controller 624 may also output data to devices other than the output device, e.g. a locally connected printing device. In some embodiments, a user may provide input to the input device(s) 626 and/or receive output from the output device(s) 625.

The functionality described herein can be performed, at least in part, by one or more hardware logic components. According to an embodiment, the computing apparatus 618 is configured by the program code when executed by the processor 619 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

Alternatively, or in addition to the other examples described herein, examples include any combination of the following:

A system for rerouting data traffic of applications, the system comprising:
at least one processor; and
at least one memory comprising computer program code, the at least one memory and computer program code configured to, with the at least one processor, cause the at least one processor to:
receive, by a failover application, a failover request including an application identifier of a main application, the failover request indicating at least one sub-application of the main application and a target data source;
select, by the failover application, a configuration data set of the main application from a plurality of configuration data sets associated with a plurality of applications based on the application identifier, the selected configuration data set defining address masks associated with the at least one sub-application, the address masks including at least one address mask of the target data source relative to the at least one sub-application;
generate, by the failover application, failover instructions for activating data traffic routing of the at least one sub-application to the target data source based on the at least one address mask of the target data source; and
provide, by the failover application, the generated failover instructions to a data traffic manager associated with the main application, whereby data traffic of the at least one sub-application is routed to the target data source by the data traffic manager.

The system described above, wherein at least a portion of the data traffic of the at least one sub-application is routed to a current data source prior to the failover request being received;
the address masks include at least one address mask of the current data source relative to the at least one sub-application; and
the generated failover instructions further include instructions for deactivating data traffic routing of the at least one sub-application to the current data source based on the at least one address mask of the current data source.

The system described above, wherein generating failover instructions for activating data traffic routing of the at least one sub-application to the target data source includes generating failover instructions for setting a priority value of the target data source to a value higher than a priority value of the current data source.

The system described above, further comprising generating failover instructions for deleting persistent connections between the at least one sub-application and the current data source, whereby, when the generated failover instructions are provided to the data traffic manager, persistent connections of the at least one sub-application to the current data source are deleted.

The system described above, wherein the address masks of the selected configuration data set include a first address mask indicating a first address portion of the target data source relative to a network location of a first server device configured to run the at least one sub-application and a second address mask indicating a second address portion of the target data source relative to a network location of a second server device configured to run the at least one sub-application.

The system described above, the at least one memory and computer program code configured to, with the at least one processor, further cause the at least one processor to:
determine, by the failover application, at least one status of the at least one sub-application, the at least one status indicating a data source to which data traffic of the at least one sub-application is routed;
wherein failover instructions are generated for activating data traffic routing of a sub-application of the at least one sub-application to the target data source based on the determined at least one status of the sub-application indicating that the data traffic of the sub-application is not routed to the target data source.

A computerized method for rerouting data traffic of applications comprising:
receiving, by a failover application, a failover request including an application identifier of a main application, the failover request indicating at least one sub-application of the main application and a target data source;
selecting, by the failover application, a configuration data set of the main application from a plurality of configuration data sets associated with a plurality of applications based on the application identifier, the selected configuration data set defining address masks associated with the at least one sub-application, the address masks including at least one address mask of the target data source relative to the at least one sub-application;
generating, by the failover application, failover instructions for activating data traffic routing of the at least one sub-application to the target data source based on the at least one address mask of the target data source; and
providing, by the failover application, the generated failover instructions to a data traffic manager associated with the main application, whereby data traffic of the at least one sub-application is routed to the target data source by the data traffic manager.

The computerized method described above, wherein at least a portion of the data traffic of the at least one sub-application is routed to a current data source prior to the failover request being received;
the address masks include at least one address mask of the current data source relative to the at least one sub-application; and
the generated failover instructions further include instructions for deactivating data traffic routing of the at least one sub-application to the current data source based on the at least one address mask of the current data source.

The computerized method described above, wherein generating failover instructions for activating data traffic routing of the at least one sub-application to the target data source includes generating failover instructions for setting a priority value of the target data source to a value higher than a priority value of the current data source.

The computerized method described above, further comprising generating failover instructions for deleting persistent connections between the at least one sub-application and the current data source, whereby, when the generated failover instructions are provided to the data traffic manager, persistent connections of the at least one sub-application to the current data source are deleted.

The computerized method described above, wherein the address masks of the selected configuration data set include a first address mask of the target data source relative to a network location of a first server device configured to run the at least one sub-application and a second address mask of the target data source relative to a network location of a second server device configured to run the at least one sub-application.

The computerized method described above, further comprising:

determining, by the failover application, at least one status of the at least one sub-application, the at least one status indicating a data source to which data traffic of the at least one sub-application is routed;

wherein failover instructions are generated for activating data traffic routing of a sub-application of the at least one sub-application to the target data source based on the determined at least one status of the sub-application indicating that the data traffic of the sub-application is not routed to the target data source.

The computerized method described above, wherein the failover request is received from at least one of a monitor application or a user command.

The computerized method described above, wherein indicating at least one sub-application of the main application includes at least one of indicating all sub-applications of the main application, a single sub-application of the main application, or a custom sub-set of sub-applications of the main application.

The computerized method described above, wherein the generated failover instructions are in JavaScript Object Notation (JSON) and the generated failover instructions are provided to the data traffic manager via Representational State Transfer (REST).

One or more computer storage media having computer-executable instructions for rerouting data traffic of applications that, upon execution by a processor, cause the processor to at least:

receive, by a failover application, a failover request including an application identifier of a main application, the failover request indicating at least one sub-application of the main application and a target data source;

select, by the failover application, a configuration data set of the main application from a plurality of configuration data sets associated with a plurality of applications based on the application identifier, the selected configuration data set defining address masks associated with the at least one sub-application, the address masks including at least one address mask of the target data source relative to the at least one sub-application;

generate, by the failover application, failover instructions for activating data traffic routing of the at least one sub-application to the target data source based on the at least one address mask of the target data source; and provide, by the failover application, the generated failover instructions to a data traffic manager associated with the main application, whereby data traffic of the at least one sub-application is routed to the target data source by the data traffic manager.

The one or more computer storage media described above, wherein at least a portion of the data traffic of the at least one sub-application is routed to a current data source prior to the failover request being received;

the address masks include at least one address mask of the current data source relative to the at least one sub-application; and the generated failover instructions further include instructions for deactivating data traffic routing of the at least one sub-application to the current data source based on the at least one address mask of the current data source.

The one or more computer storage media described above, wherein generating failover instructions for activating data traffic routing of the at least one sub-application to the target data source includes generating failover instructions for setting a priority value of the target data source to a value higher than a priority value of the current data source.

The one or more computer storage media described above, further comprising generating failover instructions for deleting persistent connections between the at least one sub-application and the current data source, whereby, when the generated failover instructions are provided to the data traffic manager, persistent connections of the at least one sub-application to the current data source are deleted.

The one or more computer storage media described above, wherein the address masks of the selected configuration data set include a first address mask of the target data source relative to a network location of a first server device configured to run the at least one sub-application and a second address mask of the target data source relative to a network location of a second server device configured to run the at least one sub-application.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute exemplary means for receiving a failover request including an application identifier, the failover request indicating at least one sub-application and a target data source; means for selecting a configuration data set from a plurality of configuration data sets based on the application identifier; means for generating failover instructions for activating data traffic routing of the at least one sub-application to the target data source based on at least one address mask of the selected configuration data set; and means for providing the generated failover instructions to a data traffic manager. The illustrated one or more processors 619 together with the computer program code stored in memory 622 constitute exemplary processing means for rerouting data traffic of applications between data sources, including processing means for receiving failover requests and generating failover instructions based on the failover requests and configuration data sets of applications associated therewith, as described herein.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for rerouting data traffic of applications, the system comprising:
   at least one processor; and
   at least one memory comprising computer program code, the at least one memory and computer program code configured to, with the at least one processor, cause the at least one processor to:
   receive, by a failover application, a failover request including an application identifier of a main application, the failover request indicating at least one sub-application of a plurality of sub-applications of the main application and a target data source, each of the plurality of sub-applications providing a functionality of the main application;
   select, by the failover application, a configuration data set of the main application from a plurality of configuration data sets associated with a plurality of applications based on the application identifier, the selected configuration data set defining address masks associated with the at least one sub-application, the address masks including at least one address mask of the target data source relative to the at least one sub-application;
   generate, by the failover application, failover instructions for activating data traffic routing of the at least one sub-application to the target data source based on the at least one address mask of the target data source; and
   provide, by the failover application, the generated failover instructions to a data traffic manager associated with the main application, whereby data traffic of the at least one sub-application is routed to the target data source by the data traffic manager.

2. The system of claim 1, wherein at least a portion of the data traffic of the at least one sub-application is routed to a current data source prior to the failover request being received;
   the address masks include at least one address mask of the current data source relative to the at least one sub-application; and
   the generated failover instructions further include instructions for deactivating data traffic routing of the at least one sub-application to the current data source based on the at least one address mask of the current data source.

3. The system of claim 2, wherein generating failover instructions for activating data traffic routing of the at least one sub-application to the target data source includes generating failover instructions for setting a priority value of the target data source to a value higher than a priority value of the current data source.

4. The system of claim 2, further comprising generating failover instructions for deleting persistent connections between the at least one sub-application and the current data source, whereby, when the generated failover instructions are provided to the data traffic manager, persistent connections of the at least one sub-application to the current data source are deleted.

5. The system of claim 1, wherein the address masks are different for each combination of one of the plurality of sub-applications and a server device associated with the target data source.

6. The system of claim 1, the at least one memory and computer program code configured to, with the at least one processor, further cause the at least one processor to:
   determine, by the failover application, at least one status of the at least one sub-application, the at least one status indicating a data source to which data traffic of the at least one sub-application is routed;
   wherein failover instructions are generated for activating data traffic routing of a sub-application of the at least one sub-application to the target data source based on the determined at least one status of the sub-application indicating that the data traffic of the sub-application is not routed to the target data source.

7. A computerized method for rerouting data traffic of applications comprising:
   receiving, by a failover application, a failover request including an application identifier of a main application, the failover request indicating at least one sub-application of a plurality of sub-applications of the main application and a target data source, each of the plurality of sub-applications providing a functionality of the main application;
   selecting, by the failover application, a configuration data set of the main application from a plurality of configuration data sets associated with a plurality of applications based on the application identifier, the selected configuration data set defining address masks associated with the at least one sub-application, the address masks including at least one address mask of the target data source relative to the at least one sub-application;
   generating, by the failover application, failover instructions for activating data traffic routing of the at least one sub-application to the target data source based on the at least one address mask of the target data source; and providing, by the failover application, the generated failover instructions to a data traffic manager associated with the main application, whereby data traffic of the at least one sub-application is routed to the target data source by the data traffic manager.

8. The computerized method of claim 7, wherein at least a portion of the data traffic of the at least one sub-application is routed to a current data source prior to the failover request being received;

the address masks include at least one address mask of the current data source relative to the at least one sub-application; and the generated failover instructions further include instructions for deactivating data traffic routing of the at least one sub-application to the current data source based on the at least one address mask of the current data source.

9. The computerized method of claim 8, wherein generating failover instructions for activating data traffic routing of the at least one sub-application to the target data source includes generating failover instructions for setting a priority value of the target data source to a value higher than a priority value of the current data source.

10. The computerized method of claim 8, further comprising generating failover instructions for deleting persistent connections between the at least one sub-application and the current data source, whereby, when the generated failover instructions are provided to the data traffic manager, persistent connections of the at least one sub-application to the current data source are deleted.

11. The computerized method of claim 7, wherein the address masks of the selected configuration data set include a first address mask of the target data source relative to a network location of a first server device configured to run the at least one sub-application and a second address mask of the target data source relative to a network location of a second server device configured to run the at least one sub-application.

12. The computerized method of claim 7, further comprising:

determining, by the failover application, at least one status of the at least one sub-application, the at least one status indicating a data source to which data traffic of the at least one sub-application is routed;

wherein failover instructions are generated for activating data traffic routing of a sub-application of the at least one sub-application to the target data source based on the determined at least one status of the sub-application indicating that the data traffic of the sub-application is not routed to the target data source.

13. The computerized method of claim 7, wherein the failover request is received from at least one of a monitor application or a user command.

14. The computerized method of claim 7, wherein indicating at least one sub-application of the main application includes at least one of indicating all sub-applications of the main application, a single sub-application of the main application, or a custom sub-set of sub-applications of the main application.

15. The computerized method of claim 7, wherein the generated failover instructions are in JavaScript Object Notation (JSON) and the generated failover instructions are provided to the data traffic manager via Representational State Transfer (REST).

16. One or more computer storage media having computer-executable instructions for rerouting data traffic of applications that, upon execution by a processor, cause the processor to at least:

receive, by a failover application, a failover request including an application identifier of a main application, the failover request indicating of at least one sub-application of a plurality of sub-applications of the main application and a target data source, each of the plurality of sub-applications providing a functionality of the main application;

select, by the failover application, a configuration data set of the main application from a plurality of configuration data sets associated with a plurality of applications based on the application identifier, the selected configuration data set defining address masks associated with the at least one sub-application, the address masks including at least one address mask of the target data source relative to the at least one sub-application;

generate, by the failover application, failover instructions for activating data traffic routing of the at least one sub-application to the target data source based on the at least one address mask of the target data source; and provide, by the failover application, the generated failover instructions to a data traffic manager associated with the main application, whereby data traffic of the at least one sub-application is routed to the target data source by the data traffic manager.

17. The one or more computer storage media of claim 16, wherein at least a portion of the data traffic of the at least one sub-application is routed to a current data source prior to the failover request being received;

the address masks include at least one address mask of the current data source relative to the at least one sub-application; and the generated failover instructions further include instructions for deactivating data traffic routing of the at least one sub-application to the current data source based on the at least one address mask of the current data source.

18. The one or more computer storage media of claim 17, wherein generating failover instructions for activating data traffic routing of the at least one sub-application to the target data source includes generating failover instructions for setting a priority value of the target data source to a value higher than a priority value of the current data source.

19. The one or more computer storage media of claim 17, further comprising generating failover instructions for deleting persistent connections between the at least one sub-application and the current data source, whereby, when the generated failover instructions are provided to the data traffic manager, persistent connections of the at least one sub-application to the current data source are deleted.

20. The one or more computer storage media of claim 16, further comprising determining that at least one other sub-application of the plurality of sub-applications of the main application is routing data traffic to the target data source before receiving the failover request.

* * * * *